United States Patent

[11] 3,633,737

[72] Inventor Paolo Magaldi
 Via Irno 505, Salerno, Italy
[21] Appl. No. 783,878
[22] Filed Dec. 16, 1968
[45] Patented Jan. 11, 1972

[54] CONVEYOR, PARTICULARLY FOR HOT MATERIALS
1 Claim, 4 Drawing Figs.

[52] U.S. Cl..................................................... 198/196
[51] Int. Cl..................................................... B65g 17/10
[50] Field of Search............................................198/195–199

[56] References Cited
UNITED STATES PATENTS

| | | | |
|---|---|---|---|
| 500,521 | 6/1893 | Wickers | 198/195 |
| 1,112,948 | 10/1914 | Turnbull | 198/196 |
| 1,354,553 | 10/1920 | Harter | 198/195 |
| 1,756,598 | 4/1930 | King | 198/199 |
| 2,123,893 | 7/1938 | Guba | 198/196 |
| 2,255,364 | 9/1941 | Pink | 198/195 X |

Primary Examiner—Robert G. Sheridan
Assistant Examiner—Frank E. Werner
Attorney—Steinberg and Blake ABSTRACT: A conveyor, particularly adapted to convey hot materials. The conveyor includes a belt made up of a network of interconnected elongated members forming a flexible mesh. This belt forms a tractive component of the conveyor. A material-holding means is connected to the belt to be moved thereby and this material-holding means forms a material-carrying component of the conveyor. The material-holding means includes a plurality of material-holding elements distributed longitudinally along the belt and having only limited engagement therewith so as to achieve a high degree of thermal separation between the material-holding means and the belt. A connecting means connects the elements of the material-holding means to the belt and this connecting means has only a highly localized area of engagement with the belt and elements so that the high degree of thermal separation between the material-holding means and belt is maintained.

PATENTED JAN 11 1972          3,633,737

INVENTOR
PAOLO MAGALDI
BY Steinberg & Blake
ATTORNEYS 3,633,737

CONVEYOR, PARTICULARLY FOR HOT MATERIALS

BACKGROUND OF THE INVENTION

The present invention, in particular, relates to conveyors which are adapted to convey relatively hot materials such as slag or other waste material encountered in foundries, hot clinkers of ash, or other similar material from furnaces, coke, hot casting sand, and the like.

Known conveyors adapted to handle materials of this type are generally made of layers of canvas covered with artificial or synthetic rubber. Such conveyors are incapable of withstanding temperatures above 340° F., and in addition they are incapable of withstanding momentary, substantially instantaneous peaks of temperature on the order of 390° F. Such conveyors when subjected to relatively high strain suddenly fail, the failure taking place by snapping or breaking of the belt completely across its width, so that the result is a requirement of complete shutdown causing production losses which in many cases amount to several tens of thousands of dollars.

It has already been proposed to provide conveyor belts of the above general type made of steel. Such endless steel belts, however, have also proven to be unsatisfactory and have been discarded. The primary reason for the failure of the steel belts is that they are subjected to thermal deformations resulting from the temperature of the conveyed material. In the same way metallic conveyors composed of linked pivotally interconnected plates carried by relatively heavy chains have not proven to be satisfactory because they are extremely expensive to install and operate and because they are only relatively safe while they are new. These conveyors include a large number of mechanical components which constantly move relative to each other, providing a source of frequent trouble which results in almost constant maintenance of such belts, so that they do not provide a satisfactory solution to the problem.

SUMMARY OF THE INVENTION

It is accordingly a primary object of the present invention to provide a conveyor which will solve the above problems.

In particular, it is an object of the invention to provide a conveyor capable of handling materials which have relatively high temperatures while at the same time completely eliminating the drawbacks of the known conveyors which are designed to accomplish the same results.

In particular, it is an object of the invention to provide a conveyor which is of a relatively simple and inexpensive construction, requiring very little if any maintenance, while at the same time capable of efficiently carrying hot materials.

In particular, it is an object of the invention to provide a conveyor which has a construction capable of achieving a high degree of thermal separation between the component of the conveyor which carries the conveyed material and the component thereof which provides the traction for the material-carrying component.

In addition, it is an object of the conveyor to provide a conveyor of the above general type which can continue to operate effectively even if, for example, a material-carrying element should break away from the conveyor.

Also, it is an object of the invention to provide a conveyor which is endless and of sufficient flexibility to extend around a roller which may, for example, have a diameter of only 4 inches or less.

The conveyor of the invention includes a belt composed of a network of elongated elements which are interconnected so as to form a flexible mesh. A material-holding means includes a plurality of material-holding elements distributed longitudinally along the belt and a connecting means connects the elements of the material-holding means to the belt. The belt forms a tractive component of the conveyor while the material-holding means forms the carrying component of the conveyor, and the material-holding means has only a limited engagement with the belt so as to maintain in this way a high degree of thermal separation between the material-holding means and the belt. The connecting means also occupies only limited highly localized areas so as to maintain the thermal separation between the material-holding means and the belt.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
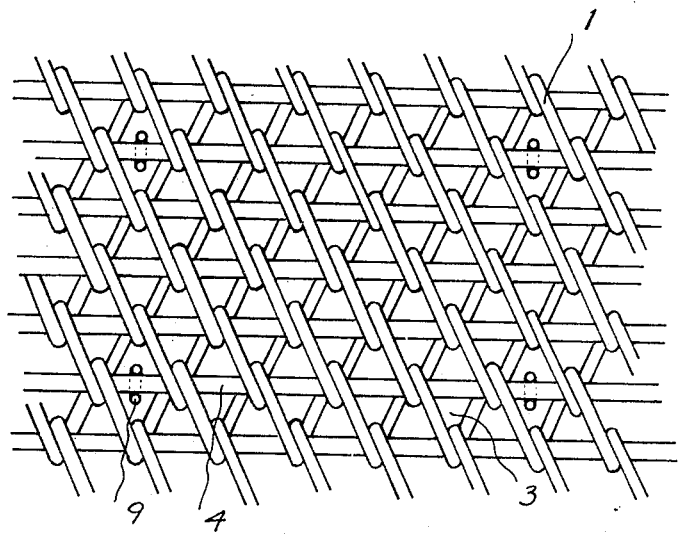
FIG. 1 is a fragmentary schematic illustration of part of an endless flexible belt of the conveyor of the invention, FIG. 1 also showing the connecting means used for connecting the belt to the material-holding means.
Figure 2:
FIG. 2 is a fragmentary transverse elevation schematically illustrating the conveyor and showing how the material-holding means is connected to the belt.

Referring now to FIG. 1, the belt of the invention is fragmentarily illustrated therein. It will be understood that this belt is of an elongated endless configuration and is in the form of a network of metal elements interconnected to form the mesh illustrated in FIG. 1. The elements which form the belt 3 indicated in FIG. 1 are in the form of steel wire 1 and transverse rods 4. These wire elements of the belt 3 are subjected to heat treatment in suitable furnaces so as to be capable of withstanding extremely high temperatures. The belt 3 has connected thereto by way of connecting means 9, a material-holding means 2 composed of overlapping metal plates of substantially trapezoidal configuration also made of steel. The plates which form the elements of the material-holding means 2 can overlap each other to an extent on the order of 50 percent or one-half their width extending longitudinally of the belt so as to form in this way a continuous channel in which the material can be held and carried.

Figure 4:
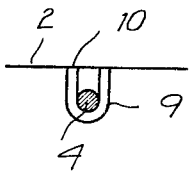
FIG. 4 is a fragmentary schematic longitudinal section illustrating in more detail how the material-holding means is connected to the belt.

Thus, the network which forms the belt 3 can be made of stainless steel or other metals and it is composed of the series of transverse rods 4 which are distributed longitudinally along the belt and which are of circular cross section as is apparent from FIG. 4. The wires 1 are looped around the rods 4 in the manner indicated in FIG. 1. Thus, each wire 1 is looped around a pair of adjoining rods 4, and the next wire 1 is looped around the same rod which is connected to the preceding wire 1 as well as the next following rod 4. The ends of a given wire 1 will be fixed, as by welding, to the ends of a rod 4, while being looped around the next rod 4, so that in this way each unit composed of a rod and a wire looped around the next rod is freely swingable about the latter rod. While the wires 1 are shown in the form of oppositely directed inclined loops extending around the successive rods, they can be designed so as to form straight meshes. Because of the hinged interconnection of the rod and wire units one to the next, they are capable of automatically adjusting themselves to rolls of even extremely small diameter.

Figure 3:
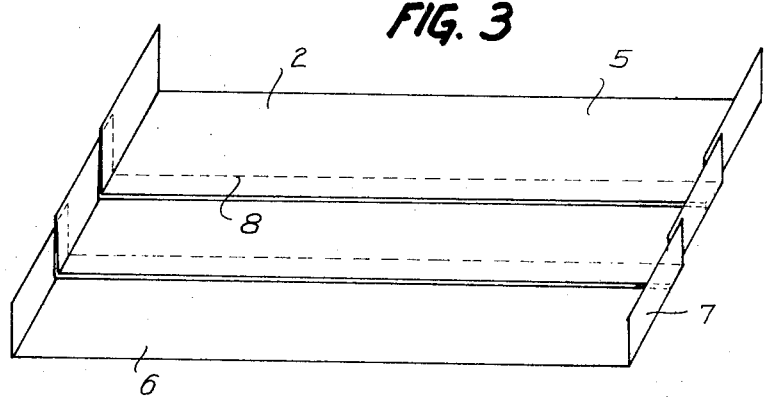
FIG. 3 is a fragmentary perspective illustration of the manner in which elements of the material-holding means overlap and coact with each other.

The elements of the material-holding means are in the form of the overlapping plates shown most clearly in FIG. 3 and made of steel also. These elements of the material-holding means 2 have opposed ends 7 directed away from the belt 3, and between the ends 7 each of the elements of the material-holding means has a trapezoidal configuration. Thus, each element has an elongated edge region 6 which is somewhat narrower than the opposed elongated edge region 5 these edge regions extending transversely across the belt. Moreover, the elements are arranged with their edge regions 5 extending beneath the edge regions 6 to have the overlapping partially internested arrangement illustrated in FIG. 3 with the edge 8 of one plate situated beneath the narrower edge region 6 of the next plate so that in this way the ends 7 of one plate can be situated between the ends 7 of an immediately preceding plate and outside of the ends 7 of the immediately following plate. As was indicated above, with this arrangement it is possible to provide an overlap of the plates which is on the order of 50 percent, so that even if one of the plates should happen to break away for any reason the remaining plates will be capable of efficiently carrying a material even if the latter is of the consistency of dust, for example.

Although the elements of the material-holding means 2 are preferably of trapezoidal configuration, they may also have other shapes. These elements are capable of being pressed to the required configuration and they are made of metal such as carbon or stainless steel, although other materials also can be used. The width of the plate elements longitudinally of the belt will be determined by the diameter of the rolls. The plates are free to expand in all directions, so that when handling extremely hot materials the expansion of the plates will not have any undesirable effects. Inasmuch as the plates are made of steel, they are extremely good heat conductors and the dimensions are such that the temperature to which the plates are heated is considerably less than the material carried thereby.

The connecting means 9 which serves to connect the elements of the material-holding means 2 to the belt 3 includes the substantially U-shaped steel elements 9 shown in the drawings. These elements 9 are distributed in the manner indicated in FIG. 1. Thus, the connecting elements 9 extend around the rods 4 and are distributed therealong so that the several elements 9 are spaced at considerable distances from each other. They are fixed in any suitable way to the plates of the material-holding means 2. For example, these plates may be formed with openings through which ends of the elements 9 extend, and these ends may be welded to the plates, after which the projected welded portions are ground off so as to give the plates a smooth surface to receive the material which is to be carried. However, suitable bolts or other fasteners may be used. In fact, bolts are preferred in the case where the runs of the belt extend substantially vertically and the elements of the material-holding means are in the form of buckets acting as an elevator for the conveyed material.

The wires 1 may be of the same diameter and cross section as the rods 4. Because of the circular cross section of the elements which make up the belt 3, the extent of contact between the plates of the material-holding means 2 and the elements of the belt 3 are only minimal. Because of this extremely small degree of direct contact between the material-carrying component and the tractive component of the conveyor of the invention, there is a very high degree of thermal separation between the material-holding means 2 and the belt 3, and because of the mesh construction of the belt there is also a free circulation of ventilating air all around the components so that the extent of heat transfer between the material-holding means 2 and the belt 3 and, of course, from the latter to the rolls or drums is extremely small. It is to be noted that the connecting means 9 also provides only a highly localized area of contact between the material-holding means 2 and the belt 3, so that the high degree of thermal separation between the tractive and carrying components of the conveyor of the invention is maintained by the connecting means 9. Thus, with this extremely small contact between the components of the conveyor and the free ventilation throughout the components of the conveyor there is practically no heat transmission to the rolls and drums of the conveyor.

The belt or tractive component, even when made of steel wire having a diameter of 0.060 inch and having a tensile strength of 80,000 p.s.i. with 75 meshes per foot has been found to be capable of withstanding a strain as great as that which can be borne by a 10-ply rubberized belt of conventional construction. However, the belt of the invention is far simpler, far less expensive, and far more efficient in its operation and can easily curve around a roll having a diameter of only 4 inches or less, approximately. If desired, however, it is possible to use a steel wire which is even more resistant to the stresses and which can reach any desired safety factor.

The dimensioning and configuration of the plates is such as to prevent any substantial transmission of heat to the network of the belt which in any event is equipped to withstand high temperatures. The plates of the material-holding means can be given any desired shape, and if desired cross strips may be added to permit the conveyor to operate even under conditions where steep inclinations are encountered.

In actual practice a belt constructed according to the invention has been capable of efficiently handling materials the temperature of which approaches 1,850° F.

I claim:

1. In a conveyor, an elongated belt formed of a network of elongated elements interconnected to provide a flexible mesh, said belt forming tractive component of the conveyor, material-holding means forming a carrying component of the conveyor and including a plurality of material-holding elements distributed longitudinally along said belt and having only limited engagement therewith, said material-holding elements having surfaces directed toward said mesh and almost entirely exposed to the outer atmosphere to provide a high degree of thermal separation between said material-holding elements and said belt, and connecting means connecting said elements to said belt only at highly localized widely separated areas to maintain the high degree of thermal separation between said elements of said material-holding means and said belt, said belt including a plurality of elongated metal rods extending transversely of said belt and distributed longitudinally therealong and a plurality of wire members looped around said rods to form said network therewith, said rods and wires all being of circular cross section, and said connecting means including substantially U-shaped members extending around said rods, distributed longitudinally therealong, and fixed to said elements of said material-holding means.

* * * * *